UNITED STATES PATENT OFFICE.

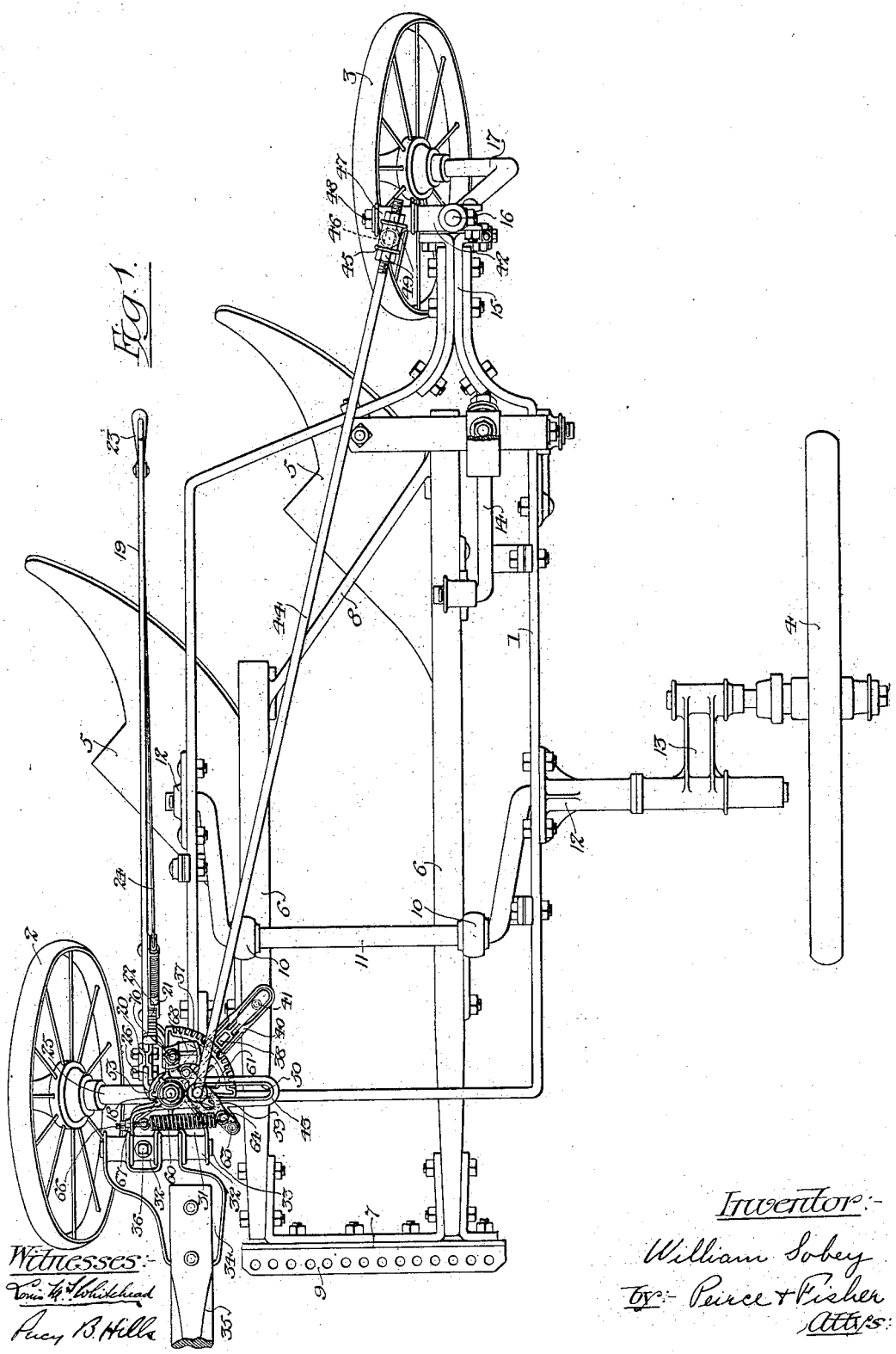

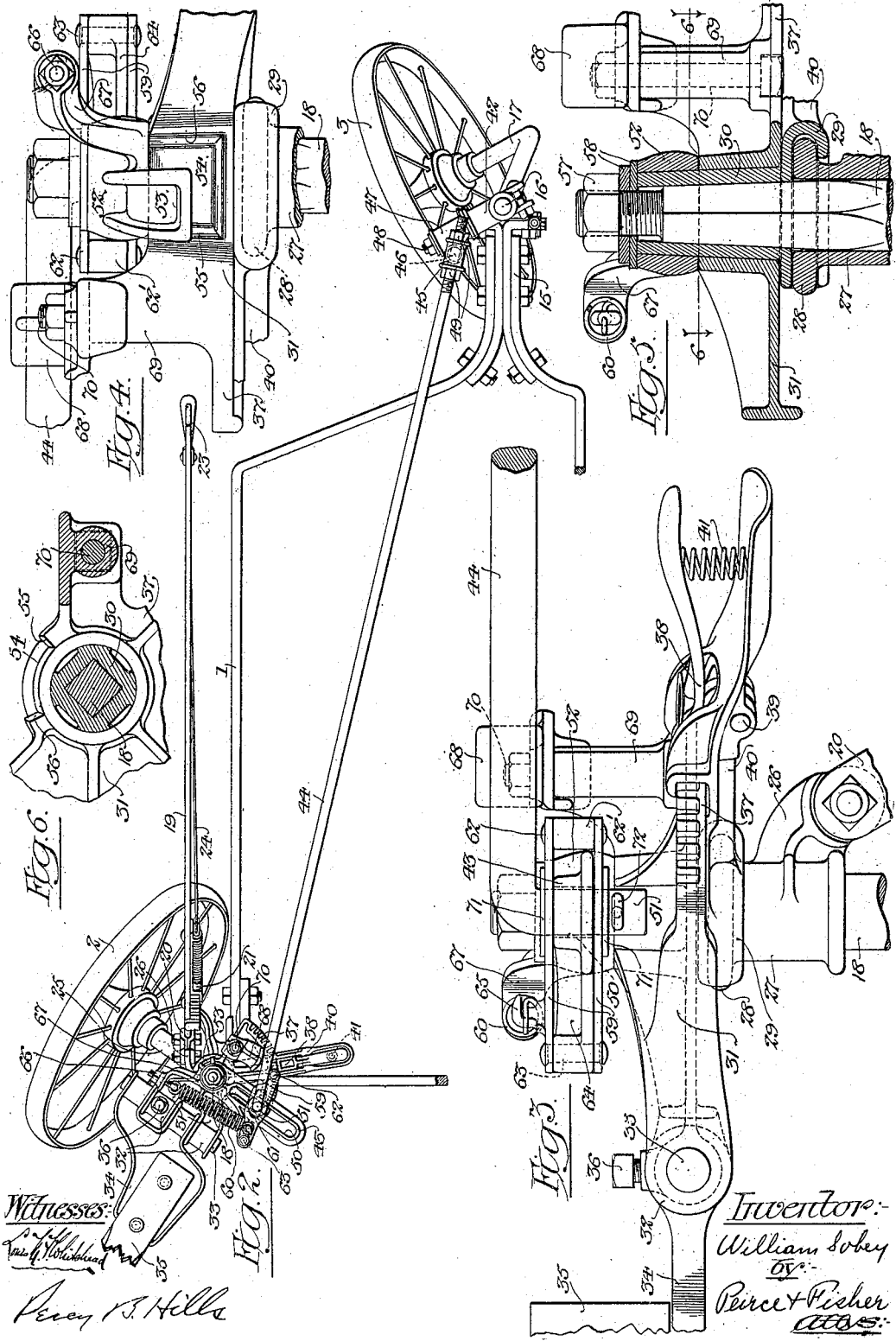

WILLIAM SOBEY, OF RACINE, WISCONSIN, ASSIGNOR TO J. I. CASE PLOW WORKS, OF RACINE, WISCONSIN, A CORPORATION.

WHEELED PLOW.

982,191.   Specification of Letters Patent.   Patented Jan. 17, 1911.

Application filed May 1, 1909. Serial No. 493,393.

*To all whom it may concern:*

Be it known that I, WILLIAM SOBEY, a citizen of the United States, and a resident of Racine, county of Racine, and State of Wisconsin, have invented certain new and useful Improvements in Wheeled Plows, of which the following is a specification.

The invention relates to wheeled plows and more particularly to means for controlling the rear caster-wheel and seeks to provide improved controlling means by which the rear caster-wheel is rigidly held in position to resist the side draft of the plow and without being affected by the slight side sway of the tongue or other steering means, but which will permit the free castering of the wheel when the plow is turned in either direction.

The invention consists in the features of improvement hereinafter set forth, illustrated in the accompanying drawings and more particularly pointed out in the appended claims.

In the drawings Figure 1 is a plan view of a plow with the improved controlling means for the rear caster-wheel applied thereto. Fig. 2 is a plan view of the controlling mechanism for the rear caster-wheel and the front furrow wheel shown in shifted position. Fig. 3 is a view in elevation of the parts of the controlling mechanism at the forward end of the plow looking away from the land side of the machine. Fig. 4 is a view in elevation of the parts shown in Fig. 3 looking in the opposite direction and with some of the parts broken away. Fig. 5 is a view in section of the parts mounted on the upper end of the vertical pivot or standard for the tongue and front furrow wheel. Fig. 6 is a detail section on the line 6—6 of Fig. 5.

The invention, as shown, is applied to a gang plow, but it will be understood that it is also applicable to a machine having but a single plow bottom.

The frame 1 may be of any suitable or usual construction and is mounted, as usual, upon the front furrow wheel 2, the rear caster-wheel 3 and the land side wheel 4. The plow bottoms 5 are mounted upon the rear end of beams 6 that are connected at their forward ends by a transverse bar 7 and at their rear ends by a diagonal brace bar 8. The usual clevis bar 9 is shown connected to the transverse bar 7. The plow beams are provided with brackets 10 journaled on a bail 11. The bail shaft is journaled in suitable bearings 12 fixed to the side bars of the frame. An arm 14 extends between the frame and the rear end of the beam 6 of the rearmost plow. The parts thus far described may be of any usual or suitable construction. The lift mechanism and the means for controlling the land side wheel are not shown, as they form no part of the present invention. At this rear end, the plow frame is provided with an extension 15 having the usual bearing in which the upright pivot or rear standard 16 for the rear caster-wheel is mounted. This standard is provided at its lower end with a rearwardly and laterally projecting crank portion or spindle 17 upon which the rear caster-wheel 3 is journaled. The front standard or vertical pivot 18 for the front furrow wheel and tongue is mounted at the front right hand corner of the frame in a suitable bearing and is vertically adjustable, as usual, by a lever 19 that is pivoted to the frame and connected to the upper end of the standard by a link 20. This lever is provided with the usual spring pressed, locking dog 21 that is arranged to engage a notched segment 22 fixed to the frame. This dog is shifted, as usual, by a trip device 23 pivoted to the end of the lever and connected to the dog by a rod 24.

The standard or pivot 18 is provided at its lower end with a laterally projecting portion or spindle 25 upon which the front furrow wheel 2 is journaled. The link 20 (see Fig. 3) is pivoted at its upper end to a lug 26 on a sleeve 27 that is rotatably mounted upon the upper end of the standard 18. This sleeve is connected to shift vertically with the standard by a flange 28 at its upper end which interlocks with a grooved flange 29 (see Fig. 5) upon the lower end of a sleeve 30. The sleeve 30 fits the squared upper end of the standard or pivot 18 and a tongue bracket 31 rotatably fits the sleeve 30 and rests upon the flange 29. This bracket is provided with a pair of forwardly projecting lugs 32 and a horizontal pivot pin 33 extends through these lugs and through a similar pair of lugs upon a casting 34 to which the rear end of the tongue 35 is bolted. The spindle 33 is held in place by a set screw 36 extending through one of the lugs 32. At its rear inner portion the tongue bracket 31 is provided with a notched segment 37, the notches of which are arranged to be engaged by a dog 38. This dog is connected by a pivot pin 39 (see Fig. 5) to a projecting arm or lever 40 which is formed in piece with the sleeve 30 and projects from the flange 29 thereof. A spring 41 extending between the rear ends of the arm or lever 40 and the pivoted dog 38 normally holds the latter in engagement with the notches of the segment 37. These rear portions of the lever and dog form handles which may be gripped to release the dog and turn the standard of the front furrow wheel relatively to the tongue bracket 31. By this means the tongue bracket and standard are adjustably connected, so that the angle of the front furrow wheel 2 relatively to the line of draft may be adjusted as desired.

The rear standard 16 is provided at its upper end with a horizontal arm 42 which extends laterally therefrom away from the land side of the machine. The tongue bracket 31 on the front standard 18 is provided with an oppositely projecting horizontal arm 43 and these arms are connected by a rod 44. This rod is pivotally connected to the arm 42 of the rear standard 16 in any suitable manner. In the preferred form shown, its rear end extends through a horizontal sleeve 45 that is connected by a vertical pivot 46 to a sleeve 47 mounted on a horizontal pivot bolt 48 on the end of the arm 42. Adjusting nuts 49 threaded on the rear end of the rod 44 engage the sleeve 45 and serve to vary the effective length of the connecting rod 44 which extends between the arms 42 and 43.

The connecting rod 44 is pivotally and slidably connected to the arm 43 preferably by providing the arm with a longitudinal slot 50 and a rod with a downturned forward end 51 engaging the slot 50. The arm 43 is arranged to swing with the tongue bracket 31 about the vertical pivot or front standard 18, but preferably has a lost-motion connection with the bracket. In the form shown, the arm is provided with a hub 52 (see Figs. 3, 4 and 5) which rotatably engages the upper end of the fixed sleeve 30 on the standard 18 and rests upon the hub on the tongue bracket 31, and a downturned extension or lug 53 (see Fig. 4) on the hub 52 extends within a recess 54 (see Fig. 6) on the hub of the tongue bracket. The shoulders 55 and 56 on the tongue bracket at the ends of the recess 45 coöperate with the lug 53 to limit the shift of the arm 43 relatively to the tongue bracket. The sleeve 30, tongue bracket 31 and arm 43 are held in position upon the front standard 18 by a nut 57 threaded on the upper reduced end of the standard and washers 58 that are interposed between the nut and sleeve 30 and overlap the hub 52 of the arm 43.

The forward end of the connecting rod 44 is normally spring-held at the inner end of the slot 50 of the arm 43 adjacent the pivot or standard 18 and, preferably, by means of a link 59 and a spring 60. The link 59, in the form shown, is double and the members thereof (see Fig. 3) extend above and below the arm 43 and are provided with slots 61 (see Figs. 1 and 2), which engage the downturned end 51 of the rod 44. The rear ends of the link members 59 are connected by a rivet 62 having a spacing sleeve 62' thereon. The forward ends are connected by a pivot pin 63 to a forwardly projecting lug 64 on the arm 43. The spring 60 is connected at one end to a hook 65 on the upper link member 59 adjacent the pivot 63 and, at its other end, the spring is connected by an adjusting bolt 66 to a lug 67 formed in piece with the arm 43, and projecting outwardly and forwardly from the hub 52 thereof. The spring 60 is thus substantially parallel to the slot 50 of the arm 43 and acts to effectively hold the forward end of the rod in the position shown in Fig. 1 adjacent the pivot or standard 18. The pivot 63 of the link 59 is located in front of and midway between the ends of the slot 50 so that, in the normal position of the parts shown in Fig. 1 the link inclines outwardly.

In the ordinary operation of the plow, the pressure on the caster-wheel 3 exerts a forward pressure on the rod 44 and by reason of the particular arrangement of the link 59 this forward pressure on the rod assists in holding its front end at the inner end of the slot of the arm 43 and adjacent the standard or vertical pivot 18 about which the tongue and front furrow wheel 2 turn. In this normal position of the parts, the rear caster-wheel is rigidly held in position and the side sway of the tongue is not transmitted to the caster-wheel. The forward pressure of the rod 44 on the arm 43 holds it in the normal position shown with the lug 53 thereon against the rear shoulder or stop 55 on the tongue bracket 31.

When the plow is to be turned in either direction, the forward end of the rod 44 must shift to the outer end of the arm 43 so that the caster-wheel 3 can turn to its full extent. When the plow is turned to the left, the tongue 35 is moved across the front of the machine and the arm 43 swings rearwardly, so that the caster-wheel 3 and arm 2 thereof can freely turn in rearward direction and by a backward pull on the rod 44 draw its forward end to the outer end of the slot 50 in the arm 43. This backward pull upon the arm moves it rearwardly, relatively to the tongue bracket 31, until the lug 53 on its pivoted end engages the forward shoulder 56 on the tongue bracket. The lost-motion connection between the arm and the tongue bracket thus allows additional freedom of movement to the arm and the rear caster-wheel 3 when the plow is turned to the left.

When the plow is turned to the right, as shown in Fig. 2, the forward end of the rod is shifted outwardly by a part shifting with the tongue bracket. This part is in the form of a cam lug 68 which is eccentrically mounted upon the rear portion of the tongue bracket. In the form shown it is secured to an upwardly projecting boss 69 on the notched segment 37 by a bolt 70. In the normal working position of the parts, shown in Fig. 1, the forward end of the rod 44 is adjacent the curved face on the outer end of this lug. When the tongue is turned to the right, as shown in Fig. 2, the lug is forced against the forward end of the rod 44 and shifts it outwardly or away from the vertical pivot or standard 18, and it thus moves the forward end of the rod and the link 59 past their dead-center position, as shown in Fig. 2. As soon as the forward end of the rod is past this dead-center position the forward pressure thereon will quickly shift it to the outer end of the slot 50 in the arm 43, so that the rear caster-wheel 3 can turn to its full extent. Whether the machine is turned to the right or left, the spring 60 and link 59 will quickly return the forward end to its normal position adjacent the vertical pivot or standard 18, as soon as the tongue 35 and front furrow wheel 2 are returned to the position shown in Fig. 1 to draw the plow straight ahead.

In prior constructions, in which the forward end of the link is held at the inner end of the arm on the vertical pivot or tongue, the arm is usually inclined forwardly from the vertical pivot, so that the angle between it and the tongue is somewhat less than a right angle. With this arrangement the forward pressure on the rod exerted by the rear caster-wheel moves its forward end outwardly to the free end of the arm when the tongue is turned to the right, but this forward inclination of the arm is apt to permit an accidental shift of the forward end of the rod to the outer end of the arm. In the present improved construction, the initial outward shift of the forward end of the rod 44, when the tongue is turned to the right, is positively effected by the lug 68, independently of the forward pressure thereon exerted by the rear caster-wheel, this forward pressure merely serving to move the forward end of the rod completely to the outer end of the arm as soon as the lug 60 has shifted the rod to the position shown in Fig. 2. With this arrangement the arm 43 need not be inclined forwardly, but is arranged substantially at right angles to the tongue 35, so that any slight sway of the tongue and arm will not permit the accidental shift of the forward end of the rod from normal position. The arrangement of the slotted link 59 is also such as to prevent this accidental shift of the controlling rod 44 for the rear caster-wheel.

Washers 71 (see Fig. 3) are arranged on the forward pivot end 51 of the rod 44 against the outer faces of the link members 59 and the forward end of the rod is held in engagement with the arm 43 and the link 59 by a cotter pin 72 extending through the lower end of the downturned portion 51.

It is obvious that numerous changes can be made in the details set forth without departure from the essentials of the invention as defined in the claims.

I claim as my invention:—

1. In a wheeled plow, the combination with the frame, caster-wheel and vertically pivoted tongue, of arms connected respectively to swing with said tongue and caster-wheel, a rod connecting said arms, the forward end of said rod being slidable along the arm of said tongue to and from the vertical pivot of said tongue and normally held adjacent said pivot, and means arranged to engage and shift the forward end of said rod away from said pivot of said arm when the tongue is turned in one direction, substantially as described.

2. In a wheeled plow, the combination with the frame, caster-wheel and vertically pivoted tongue, of arms connected respectively to swing with said tongue and caster-wheel, a rod connecting said arms, the forward end of said rod being slidable along the arm of said tongue to and from the vertical pivot of said tongue and normally spring-held adjacent the vertical pivot of said tongue, and a part shifted by said tongue for engaging and shifting the forward end of said rod away from said pivot when the tongue is turned in one direction, substantially as described.

3. In a wheeled plow, the combination with the frame, caster-wheel and vertically pivoted tongue, of arms connected respectively to swing with said tongue and caster-wheel, a rod connecting said arms, the forward end of said rod being slidable along the arm of said tongue to and from the vertical pivot of said tongue, a pivoted spring-held link engaging the forward end of said rod for holding it adjacent the vertical pivot of said tongue, and a part arranged to engage the forward end of said rod and shift it away from said pivot when the tongue is turned in one direction, substantially as described.

4. In a wheeled plow, the combination with the frame, a rear caster-wheel, a vertical standard for said wheel, and a vertically pivoted tongue, of a laterally projecting arm connected to said standard, an oppositely projecting arm connected to swing with said tongue about its vertical pivot, a rod pivotally connected at its rear end to the arm of said standard and pivotally and slidably connected at its forward end to the arm of said tongue, a spring-held link engaging the connection between said rod and the arm of said tongue for holding the forward end of the rod adjacent the vertical pivot of said tongue, and a lug swinging with said tongue about its vertical pivot and arranged to shift the forward end of said rod away from said pivot when the tongue is turned in one direction, substantially as described.

5. In a wheeled plow, the combination with the frame, a rear caster-wheel, a vertical standard for said wheel, and a vertically pivoted tongue, of a laterally projecting arm connected to said standard, an oppositely projecting arm connected to swing with said tongue about its vertical pivot, a rod pivotally connected at its rear end to the arm of said standard and pivotally and slidably connected at its forward end to the arm of said tongue, a link pivoted to the arm of said tongue midway between its ends and engaging the connection between said arm and said rod, a spring for holding the end of said link and the forward end of said rod adjacent the vertical pivot of said tongue, and means for shifting the forward end of said rod and said link away from said pivot when the tongue is turned in one direction, substantially as described.

6. In a wheeled plow, the combination with the frame, a rear caster-wheel pivoted on a vertical axis and a vertically pivoted tongue, of a laterally extending arm connected to the pivot of said caster-wheel, an oppositely projecting arm connected to swing with said tongue about its vertical pivot, a rod pivotally connected at its rear end to the arm of said caster-wheel and pivotally and slidably connected at its forward end to the arm of said tongue, the forward end of said rod being normally spring-held adjacent the vertical pivot of said tongue, and a part connected to swing with said tongue about its vertical axis arranged to shift the forward end of said rod away from said pivot when the tongue is turned in one direction, substantially as described.

7. In a wheeled plow, the combination with the frame, a rear caster-wheel pivoted on a vertical axis and a vertically pivoted tongue, of a laterally extending arm connected to the pivot of said caster-wheel, an oppositely projecting arm connected to swing with said tongue about its vertical pivot and having a longitudinal slot, a rod connecting said arms and having its forward end slidably engaging said slot, a spring for holding the forward end of said rod toward the pivoted end of said slotted arm and a lug for shifting the same toward the free end of said arm when the tongue is turned in one direction, substantially as described.

8. In a wheeled plow, the combination with the frame, a rear caster-wheel pivoted on a vertical axis and a vertically pivoted tongue, of a laterally extending arm connected to the pivot of said caster-wheel, an oppositely projecting arm connected to swing with said tongue about its vertical pivot, and having a longitudinal slot, a rod connecting said arms and having its forward end slidably engaging said slot, a spring-held link pivoted on one side of and between the ends of said slot and engaging the forward end of said rod to hold it adjacent the vertical pivot of said tongue, and a lug connected to swing with said tongue about said vertical pivot for shifting said link and the forward end of said rod away from said pivot when the tongue is turned in one direction, substantially as described.

9. In a wheeled plow, the combination with a frame, a rear caster-wheel and a vertically pivoted tongue, of oppositely projecting, horizontal arms connected respectively to swing with said caster-wheel and said tongue, the arm of said tongue being arranged at right angles thereto, a rod pivotally connected at its rear end to the arm of said caster-wheel and pivotally and slidably connected at its forward end to the arm of said tongue, a spring for holding the forward end of said rod adjacent the vertical pivot of said tongue, and means, independent of said caster-wheel, for shifting the forward end of said rod away from said pivot, when the tongue is turned in one direction, substantially as described.

10. In a wheeled plow, the combination with a frame, a rear caster-wheel and a vertically pivoted tongue, of oppositely projecting, horizontal arms connected respectively to swing with said caster-wheel and said tongue, the arm of said tongue being arranged at right angles thereto, a rod pivotally connected at its rear end to the arm of said caster-wheel and pivotally and slidably connected at its forward end to the arm of said tongue, a spring for holding the forward end of said rod adjacent the vertical pivot of said tongue, and an eccentric lug connected to swing with said tongue about its vertical pivot for positively shifting the forward end of said rod away from said pivot when the tongue is turned in one direction, substantially as described.

11. In a wheeled plow, the combination with the frame, a rear caster-wheel, a front furrow wheel, vertical standards for said wheels and oppositely projecting arms on said standards, of a rod connected to said arms and slidable along the arm of said front furrow wheel, a spring for holding the forward end of said rod adjacent said front standard, and a part connected to said front standard for shifting the forward end of said rod away from said standard when the latter is turned in one direction.

12. In a wheeled plow, the combination with the frame, a rear caster-wheel, a front furrow wheel, vertical standards for said wheels and oppositely projecting arms on said standards, of a rod connected to said arms and slidable along the arm of said front furrow wheel, a spring for holding the forward end of said rod adjacent said front standard, an eccentric lug connected to said front standard for shifting the forward end of said rod away from said standard when the latter is turned in one direction, and means controlled by the team for turning said front standard and furrow wheel, substantially as described.

13. In a wheeled plow, the combination with the frame, a rear caster-wheel, a front furrow wheel, vertical standards for said wheels, and oppositely projecting arms on said standards, the arm on said front standard having a horizontal slot, of a rod pivotally connected at its rear end to the arm of said rear standard and having its forward end pivotally and slidably engaging said slot, a spring for holding the forward end of said rod at the end of said slot adjacent said front standard, means connected to said front standard for shifting the forward end of said rod away therefrom when said standard is turned in one direction, and a tongue for shifting said standard.

14. In a wheeled plow, the combination with the frame, a rear caster-wheel, a front furrow wheel, vertical standards for said wheels, and oppositely projecting arms on said standards, the arm on said front standard having a horizontal slot, of a rod pivotally connected at its rear end to the arm of said rear standard and having its forward end pivotally and slidably engaging said slot, a link pivoted on said arm to one side of and midway between the ends of said slot and engaging the forward end of said rod, a spring connected to said link and to the end of said arm for holding the forward end of said rod adjacent said standard, and a tongue connected to said front standard.

15. In a wheeled plow, the combination with the frame, a rear caster-wheel, a front furrow wheel, vertical standards for said wheels, and oppositely projecting arms on said standards, the arm on said front standard having a horizontal slot, of a rod pivotally connected at its rear end to the arm of said rear standard and having its forward end pivotally and slidably engaging said slot, a spring-held link pivoted to said arm in front of and midway between the end of said slot and engaging the forward end of said rod to hold the same adjacent said standard, an eccentric lug connected to said standard to shift the forward end of said rod away therefrom when said standard is turned in one direction, and a tongue connected to said standard to turn the same, substantially as described.

16. In a wheeled plow, the combination with the frame, a rear caster-wheel, and a vertically pivoted tongue bracket, of an arm connected to said caster-wheel, an arm arranged to swing with said tongue bracket and having a lost-motion connection therewith, a rod connecting said arms and having its forward end slidable along the arm of said tongue bracket, and a spring for holding the forward end of said rod adjacent the pivot of said tongue bracket, substantially as described.

17. In a wheeled plow, the combination with the frame, a rear caster-wheel, a vertically pivoted tongue bracket, and a tongue connected to said bracket, of a laterally projecting arm connected to said caster-wheel, an oppositely projecting arm pivoted concentrically with said tongue bracket and having a lost-motion connection therewith, a rod connecting said arms and having its forward end slidable along the arm on said tongue bracket, a spring for holding the forward end of said rod adjacent the pivot of said arm and bracket, and an eccentric lug on said bracket for shifting the forward end of said rod away from said pivot when the tongue is turned in one direction, substantially as described.

18. In a wheeled plow, the combination with the frame, a rear caster wheel, a front furrow wheel and vertical front and rear standards for said wheels, of a tongue bracket adjustably connected to the upper end of said front standard, a tongue connected thereto, a laterally projecting arm on the rear standard, an oppositely projecting slotted arm loosely mounted on said front standard and having a lost-motion connection with said bracket, a rod pivotally connected at its rear end to the arm on said rear standard and having its forward end pivotally and slidably engaging said slotted arm, a spring for holding the forward end of said arm adjacent said front standard, and a lug on said bracket for positively shifting the forward end of said rod away from said standard when the tongue is turned in one direction, substantially as described.

WILLIAM SOBEY.

Witnesses:
Roy Fred Adams,
Roy Winfield Martin.